May 14, 1968 W. A. FISCHER ET AL 3,383,470

AUXILIARY LINE CIRCUIT

Filed July 30, 1964 3 Sheets-Sheet 1

INVENTORS
WILLIAM A. FISCHER
DONALD C. PILKINTON
GEORGE F. DOHERTY, JR.
MILTON KLEIN
RICHARD A. WALSH
RALPH W. WYNDRUM

BY William F. Simpson,
ATTORNEY

United States Patent Office 3,383,470

Patented May 14, 1968

3,383,470

AUXILIARY LINE CIRCUIT

George F. Doherty, Jr., and William A. Fischer, Matawan, Milton Klein and Donald C. Pilkinton, Metuchen, and Richard A. Walsh and Ralph W. Wyndrum, Monmouth, N.J., assignors to Bell Telephone Laboratories, Incorporated, New York, N.Y., a corporation of New York Filed July 30, 1964, Ser. No. 386,310
4 Claims. (Cl. 179—18)

ABSTRACT OF THE DISCLOSURE

Calling connections from a private line switching network are afforded the use of charging and recording equipment in a commercial switching system by an auxiliary line circuit which is arranged to initiate a dial tone request in the commercial system in response to the enabling of an associated trunk in the private system. The auxiliary line circuit returns a ready signal to the private line network upon the connection of a register and the termination of a predetermined time interval. An answer signal is subsequently transmitted by the auxiliary line circuit to the private network a predetermined interval after the completion of signalling.

Figure 1:
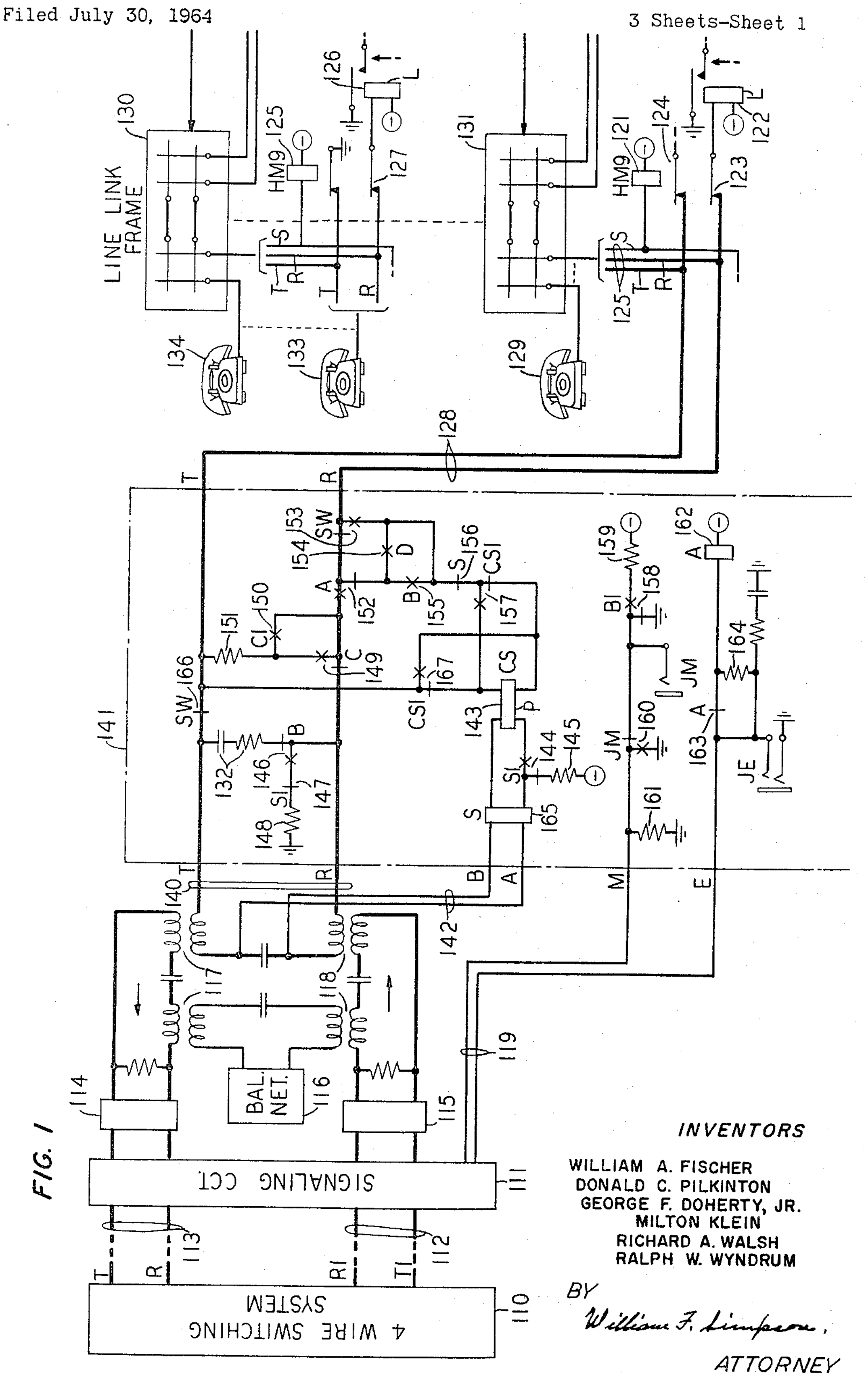

This invention relates to an auxiliary line circuit for interconnecting automatic switching centers and, more particularly, for interconnecting switching centers of a private wire switching network with a switching center of a public or commercial communication switching network.

Previously interconnecting circuits between switching centers extended from a first switching center to a second switching center and at the second switching center the circuits terminated on a trunk frame or in switches which avoided the line finding or concentrating stages of the network. These arrangements have been economical because the trunks are provided on such a basis that they are used a large percentage of the time during the busy hour so it does not pay to provide concentration circuits between the trunks and the switching equipment at the incoming end.

In these prior arrangements the record of the calls is obtained either at the originating switching station or at some tandem switching station. This arrangement has been extended in a patent application of R. C. Avery, Ser. No. 177,815, filed Mar. 6, 1962, now Patent No. 3,157,743, dated Nov. 17, 1964, to obtain and maintain a record at the originating station of each of the switching centers through which a call is routed. When a call is diverted from a private wire switching network to a public or commercial network the station or switching center at which the call is diverted is likewise transmitted to the originating station and recorded thereat as part of the record of the call.

None of these arrangements leave any record of the call in the public or commercial switching system and thus provide no independent check or record of such calls for charging purposes in the public or commercial switching network.

It is an object of our invention to provide an interconnecting auxiliary circuit for permitting connection between the switching center of a private network and switching center of a public or commercial switching network in which a record of the call is obtained in the public or commercial switching network either at the station at which the call enters the public or commercial network or at some tandem switching center and in the same manner as a corresponding record is obtained from the stations in the public or commercial communication network.

A feature of our invention relates to auxiliary line circuits which may be connected between an incoming trunk circuit from a switching center of a private wire switching network and terminals of a public or commercial network which are similar to terminals normally interconnected with subscriber lines.

A feature of our invention relates to interconnections such that a call incoming from a distant switching center is recorded in the same manner as calls from ordinary subscribers.

When incoming trunks are terminated on subscriber line terminals either through an auxiliary line circuit, such as in accordance with this invention, or otherwise, a record of the call will be made at the incoming central office or a tandem central office, and in addition an appropriate class of service may be assigned to the incoming trunk or calls. However, sufficient time must be allowed for the line finding equipment or similar equipment in the incoming office to function and to connect a dial pulse or signal receiving circuit to the designated terminals and thus to the incoming trunk circuit through the auxiliary line circuit. The time required for the line finder or equivalent equipment to function is variable over wide limits depending upon the traffic or calling rate of the office at the particular time the incoming call is received.

In accordance with an exemplary embodiment of our invention the incoming call is first acknowledged and then the distant office signaled to start transmission of dial or calling signals only after a lapse of a predetermined interval of time and the establishment of a path from the trunk circuit to a suitable signal receiver capable of receiving the incoming pulses or signals which pulses or signals are employed to designate the desired called station.

When the call is routed through a tandem switching center of the public or commercial network and a record of the call obtained at such switching center, the answer signal is usually not relayed through this tandem switching center. Consequently, it is desirable if not necessary to generate such an answer signal in the auxiliary line circuit in accordance with the exemplary embodiment of our invention described herein to properly condition the circuits of the private wire switching network to be switched or conditioned for the transmission or communication conditions thereof. Such an answer signal is generated at a predetermined interval of time after the transmission of the dial pulses or other signals designating the called subscriber's station.

Another feature of the auxiliary line circuit in accordance with an exemplary embodiment of our invention relates to protective means which will accept a second incoming call over a trunk circuit before the first call is fully disconnected but prevents this second call from interfering with the disconnection of the first call.

In addition the circuits of the exemplary embodiment of our invention described herein are arranged so that the distant central office is not signaled to start transmission of the calling signals until a previous call has been fully disconnected and a pulse or signal receiver at the incoming switching center interconnected with the incoming trunk over which the call is transmitted to the public or commercial switching network.

Figures 2, 4:
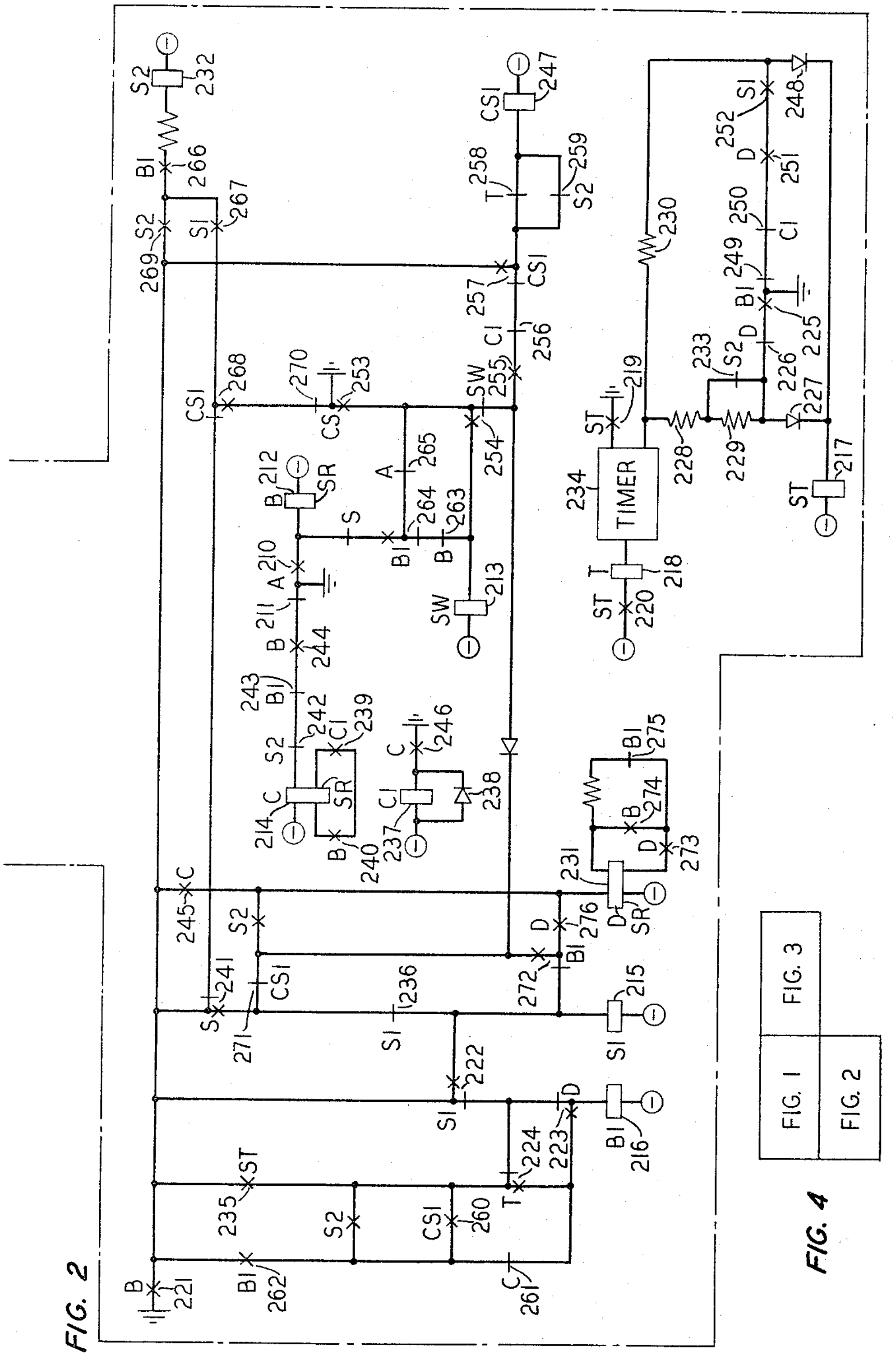
Figure 3:
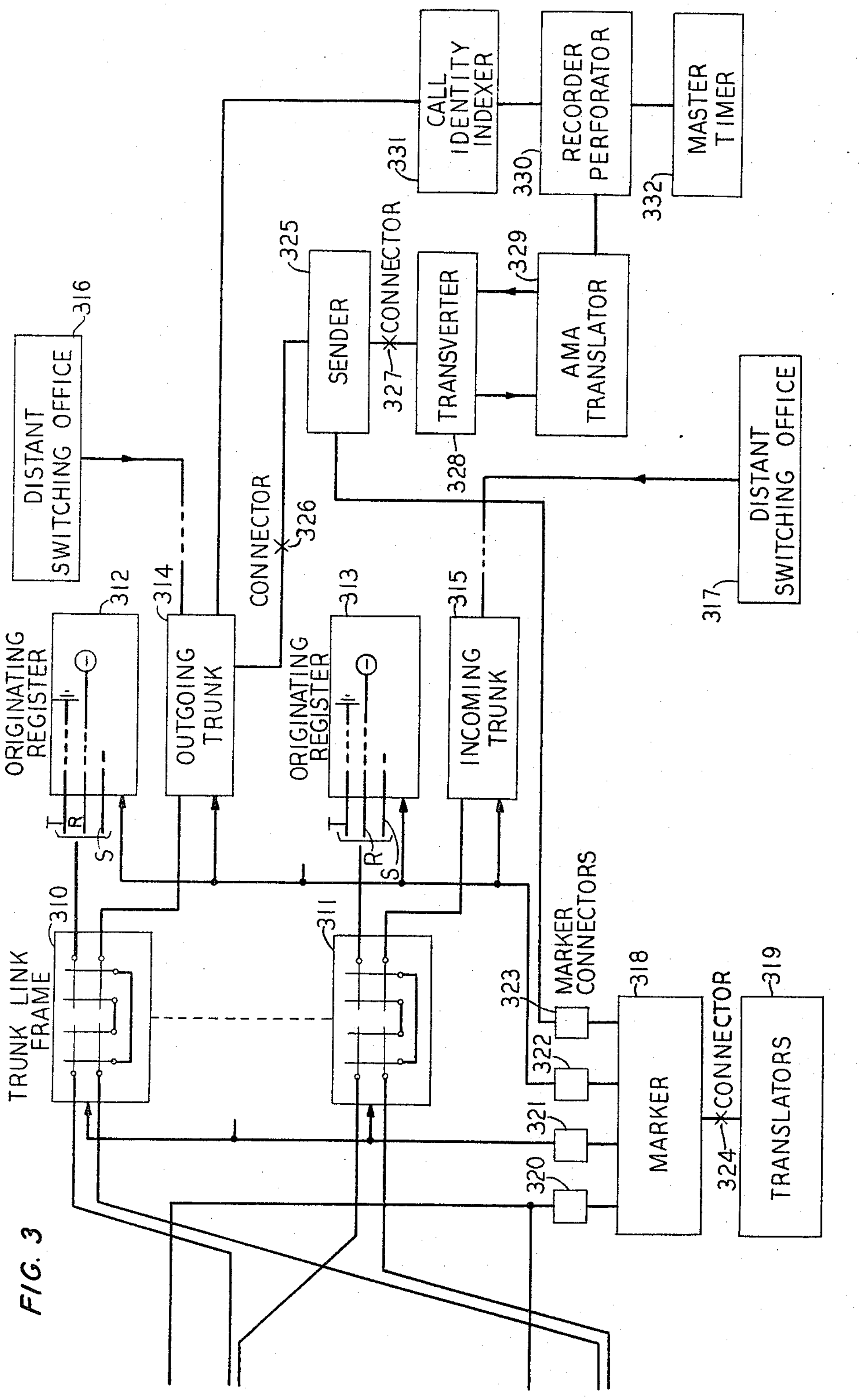

The foregoing and other objects and features of our invention may be more readily understood from the following description of FIGS. 1, 2 and 3 when positioned in accordance with FIG. 4.

FIGS. 1 and 3 show details of the manner in which the auxiliary line circuit in accordance with our invention may be interconnected between a trunk extending from a four-wire No. 5 crossbar switching system and a switching center of a public or commercial switching network. FIG. 1 also shows part of the switching and control circuits of such an auxiliary line in accordance with an exemplary embodiment of our invention while FIG. 3 shows portion of a typical switching system with which an exemplary embodiment of our invention is arranged to cooperate; and FIG. 2 shows a number of the control circuits of the auxiliary line circuit in accordance with an exemplary embodiment of our invention.

Referring to FIGS. 1, 2 and 3 now when arranged as shown in FIG. 4, the rectangle 110 represents a four-wire switching system such as disclosed in the copending application of J. W. Gorgas, G. A. Hurst, J. S. Pfrommer, W. H. Scheer, Ser. No. 134,633, filed Aug. 29, 1961, now Patent No. 3,150,236 dated Sept. 22, 1964. This switching center is connected by means of a four-wire trunk 112 and 113 to the switching center represented in the remaining portion of FIGS. 1 and 3. This switching system may be of any suitable type.

As shown in the drawing the switching system shown in FIGS. 1 and 3 includes the primary and secondary crossbar switches 130 and 131 on the line link frame. The subscribers' stations 129, 133 and 134 are connected to the primary crossbar switches. Each of the subscriber stations 129, 133 and 134 has a hold magnet such as 125 and a line relay such as 126 individual to it.

An auxiliary line circuit is interconnected with terminals 125 which terminals are similar to the terminals to which the subscriber stations are connected.

This switching center also includes the primary and secondary crossbar switches 310 and 311 on the trunk link frame. The crossbar switches on the line link frames and on the trunk link frames are interconnected in the usual manner.

The originating registers are represented by two such registers such as 312 and 313 which are connected to crossbar switches on the trunk link frames. The outgoing trunks are represented by trunk 314 and the incoming trunks by trunk 315. The trunk 314 is shown interconnected with a distant switching center 316 and trunk 315 with the distant switching center 317. These distant switching centers may be the same or different switching centers and either or both may be similar to the switching center shown in FIGS. 1 and 3 or they may be of any other type including tandem switching centers.

The marker 318, translator 319, the marker connectors 320, 321, 322 and 323 and connector 324 are employed in establishing connections through the various crossbar switches.

The sender 325 and sender connector 326 are employed in extending connections over the outgoing trunk 314 to and through other switching centers such as 316.

Automatic message accounting equipment is provided for automatically recording various calls. This equipment includes connector 327, transverter 328, the AMA translator 329, call identity indexer 331, recorder perforator 330 and master timer 332.

This switching center may be of the type shown in Patent 2,585,904, granted to A. J. Busch, Feb. 19, 1952. If it is desired to record calls incoming to such a switching system at a tandem switching center instead of at this switching center, reference may be made to Patent No. 2,848,543, granted to R. N. Breed et al., Aug. 19, 1958. If it is desired to make a record of the call at the incoming office shown in FIGS. 1 and 3, then reference is made to Patent No. 2,688,658 granted to W. W. Carpenter et al. on Sept. 7, 1954.

While the above three patents describe crossbar switching systems, our invention will work equally well with either panel or step-by-step switching systems or with other automatic switching systems.

The equipment shown within the dot-dash-line 141 represents an auxiliary line circuit in accordance with an exemplary embodiment of our invention and is interconnected between the subscriber line termination of the switching system shown in the right-hand portion of FIGS. 1 and 3 and the four-wire switching system shown in the left-hand portion of FIG. 1.

The four-wire switching trunk comprises the circuits 113 and 112 which terminate in a four-wire terminating circuit comprising the repeat coils 117 and 118, balancing network 116 and the matching or attenuation pads 114 and 115. Similar four-wire terminating circuits are shown and described in greater detail in Patent No. 2,024,592 granted to J. B. McKim on Dec. 17, 1935.

It is assumed that the signaling over the four-wire transmission circuits 112 and 113 is of the type designated E and M. This signaling circuit is represented by the rectangle 111 with the E and M leads 119 extending therefrom. Such signaling circuits are described in greater detail in an article published in the Bell System Technical Journal, vol. 39, pp. 1381–1444, November 1960, entitled, "Signaling Systems for Control of Telephone Switching," by C. Breen and C. A. Dahlbom. This article also describes other types of signaling which may be substituted for the E and M signaling system in the manner described. All these various switching systems, signaling systems and lines and trunks operate in a normal and usual manner in cooperation with the auxiliary line circuit in accordance with our invention.

In order to determine that a pulse receiving circuit has been attached by the switching equipment shown in FIGS. 1 and 3 in the manner described in the above-identified patents, ground has been removed from the contact 124 of the hold magnet 121, thus normally removing ground from the tip conductor of the trunk circuit 128. As shown in FIG. 1 described in greater detail in the above-identified patent of Busch and the above-identified patent of Carpenter the tip and ring terminals 125 are connected to a vertical of the crossbar switch in a manner similar to the manner in which subscribers' lines are connected to verticals of crossbar switches on the line link frame.

When the four-wire switching system 110 initiates a call intended for some switching station of the public or commercial switching network, or when a call is transferred from the four-wire system to the public system, the four-wire system will transmit a signal over the four-wire circuits 112 and 113 to the signaling equipment 111 which in turn causes a ground to be applied to the E conductor thus completing a circuit for the operation of the A relay 162.

The operation of the A relay 162 causes contacts 163 to open and this in turn causes the resistor or network 164 to be inserted in the circuit of the A relay 162.

The operation of relay 162 also causes contacts 210 to close and contacts 211 to open. Closure of contacts 210 completes an obvious circuit for the operation of the B relay 212.

The operation of the B relay 212 causes contacts 221 to close and complete a circuit for the operation of the B1 relay 216 from ground through the operated contacts 221 of the B relay 212, the normal contacts 222 of the S1 relay 215 and the normal contacts 223 of the D relay 231 to battery through the winding of the B1 relay.

The operation of the B1 relay 216 operates contacts 225 and completes a circuit for the operation of the ST relay 217 from battery to the winding of the relay 217, the decoupling diode 227, the normal break contacts 226 of the D relay 231 and the operated contacts 225 of the B1 relay 216 to ground. The ST relay 217 in operating causes contacts 219 and 220 to close and start the operation of the timer 234. The timer 234 is controlled by the value of the resistor 228 which is connetced to ground through the break contacts 233 of the S2 relay 232, the break contacts 226 of the D relay 231 and the operated contacts 225 of the B1 relay 216. With resistor 228 thus controlling the timer 234, the T relay 218 will operate approximately 150 milliseconds after the operation of the ST relay 217.

The operation of the ST relay 217 also causes contacts 235 to be closed and complete a holding circuit for maintaining the B1 relay 216 operated from ground through the operated contacts 221 of the B relay 212, contacts 235 of the ST relay 217 and the break contacts 224 of the T relay 218 to battery through the winding of the B1 relay 216.

The operation of the B1 relay 216 causes contacts 158 to be actuated. As a result ground is removed from the M conductor 119 and battery through resistor 159 and contacts 158 connected to the M lead and to ground through the resistor 161. Thus, a battery potential is applied to the M conductor extending to the signaling circuit 111. This battery is employed to signal the distant four-wire switching system 110 and acknowledge the operation of the A relay 162. The four-wire switching system will not further respond to this battery potential at this time but will await a further signal, as described herein, before transmitting dial pulses over the four-wire signaling circuit.

The operation of the B relay 212 actuates contacts 146 and removes the network 132 from across the tip and ring conductors of the trunk circuit 128.

The operation of the A relay 162 causes contacts 152 to be operated and the operation of the B relay 212 causes contacts 146 of the B relay to be operated. The operation of these two sets of contacts completes a circuit for the operation of the L relay 122 of the switching system shown in the right-hand portion of FIG. 1 and in FIG. 3. The circuit for the operation of the L relay extends from battery through the winding of the L relay 122, the break contacts 123 of the hold magnet 121 assigned to the trunk conductors 128. From contacts 123 the circuit extends over the R conductor, through the normal contacts 153 of the SW relay 213, the operated contacts 152 of the A relay 162, a break contact 149 of the C relay 214, the operated contacts 146 of the B relay 212 and the break contacts 147 of the S1 relay 215 to ground through the resistor 148.

The operation of the L relay 122 initiates the operation of the switching system shown in the right-hand portion of FIG. 1 and in FIG. 3. The operation of this system then causes a path to be established through crossbar switches 131 on the line link frame and through crossbar switches on the trunk link frame to an originating register, for example through switches 310 to the originating register 312. Upon the establishing of such a path a circuit is completed for the operation of the S relay 165 from battery through resistor 145, the break contacts 144 of the S1 relay 215, the lower winding of the S relay 165 and then through the winding of the repeat coil 117, the T conductor 140, the break contacts 166 of the SW relay 213 and over the tip conductor of the auxiliary line circuit 128 and then through the switching system to ground in the incoming register or pulse receiving circuit 312.

The operation of the S relay 165 at this time indicates that the pulse receiving circuit has been interconnected with the auxiliary trunk circuit 141 and thus ready to receive incoming calling or dialing signals. The operation of the S relay 165 causes contacts 241 to close and complete a circuit for the operation of the S1 relay 215 from battery through the winding of the S1 relay 215, the break contacts 236 of the S1 relay 215 and the operated contacts 241 of the S relay 165 to ground through the operated contacts 221 of the B relay 212. The S1 relay 215 in operating closes contacts 222 which completes a locking circuit for maintaining itself operated under control of the B relay 212. This locking circuit extends from battery through the winding of the S1 relay 215, the operated contacts 222 of the S1 relay 215 to ground through the operated contacts 221 of the B relay 212.

At the end of approximately 150 milliseconds timer 234 causes the T relay 218 to operate and actuate contacts 224. The operation of the contacts 224 of T relay 218 and the operation of the contacts 222 of the S1 relay 215 interrupt both of the above-described circuits of the B1 relay 216.

The release of the B1 relay 216 described above causes the contacts 225 to release and interrupt the operating circuit of the ST relay 217. This relay releases and causes its contacts 219 and 220 to release with the result that the T relay 218 is released and the timer circuit 234 restored to its idle or initial condition.

Thus, if the S1 relay 215 is operated during the 150 milliseconds indicating that the originating register has been interconnected with the T and R conductors 128 of the auxiliary line circuit 141, then the operation of the T relay 218 at the end of the 150 millisecond time interval causes the B1 relay 216 to release.

If the S1 relay 215 has not operated by this time then the B1 relay 216 does not release until an originating register is interconnected with the T and R conductors 128 of the auxiliary line circuit 141 by the switching system shown in the right-hand portion of FIG. 1 and in FIG. 3.

In response to the operation of both the T relay 218 and the S1 relay 215 the B1 relay releases and releases the contacts 158. The release of these contacts reconnect ground to the M lead extending to the signaling circuit 111 which signal is then repeated over the four-wire trunk circuit to the four-wire switching system 110. This signal indicates to the four-wire switching system that a pulse receiver has been interconnected with the other end of the trunk and that this equipment is in condition to receive the dial pulses or calling signals.

The operation of the S1 relay 215 also opens contacts 147 and thus removes the resistor 148 from the ring conductor in the auxiliary line circuit 141. The operation of the S1 relay however also closes contacts 144 with the result that battery through the resistor 145 is removed from the tip conductor and a loop circuit is established from the T conductor 125, through break contacts 166 of the SW relay 213, the winding of the repeat coil 117, the lower winding of the S relay 165, the operated contacts 144 of the S1 relay 215, the left-hand winding of the CS relay 143, the upper winding of the S relay 165, winding of the repeat coil 118, ring conductor of the auxiliary line circuit 141, the break contacts 149 of the C relay 214, the operated contacts 152 of the A relay 162 and the break contacts 153 of the SW relay 213 to the R conductor 128. The T conductor extends to ground in the originating register and the R conductor extends to battery in this originating register through this switching system shown in the right-hand portion of FIG. 1 and in FIG. 3 as described in the above and in the above-identified patents. Current flowing through both windings of the S relay 165 causes this relay to be maintained in its operated condition at this time. The current flowing through the left-hand winding of relay 143 however does not cause this relay to operate. Relay 143 is a polarized relay and the current flowing through its left-hand winding at this time is in the direction so that this relay does not operate at this time.

In the response to the transmission of the signal due to the release of the B1 relay 216 and the release of the contacts 158, the four-wire switching system 110 will start the transmission of dial pulses over the four-wire trunk 112 and 113 to the signaling circuit 111. As a result the dial pulses are transmitted over the E conductor 119.

In response to the first dial pulse the A relay 162 releases and closes its contacts 163 thus short circuiting the resistor 164. In addition the release of the A relay 162 causes contacts 152 to be restored to their unoperated condition so that the pulse is repeated over the T and R conductors 128 to the originating register 312 attached thereto through the switching system of FIGS. 1 and 3.

Release of the A relay 162 also causes contacts 210 to release and interrupt the circuit of the B relay 212. The B relay 212 however is a slow release relay so that it remains operated during the dial pulses repeated by the A relay 162.

The release of the A relay 162 also releases contacts 211 which contacts close and complete a circuit for the operation of the C relay 214 from battery through the upper winding of the C relay 214, the break contacts 242 of the S2 relay 232 and the break contacts 243 of the B1 relay 216, the operated contacts 244 of the B relay 212 to ground through the break contacts 211 of the A relay 162.

The operation of the C relay 214 closes contacts 246 which in turn completes an obvious circuit for the operation of the C1 relay 237. The operation of the C1 relay 237 causes contacts 239 to close and these contacts together with contacts 240 on the B relay 212 short circuit the lower winding of the C relay 214, thus causing this relay to be a slow-release relay so that it will remain operated during each train of dial pulses representing the various digits of the called designation or number transmitted from the four-wire switching system 110.

The C1 relay 237 has diode 238 connected in parallel with its winding which likewise causes this relay to be slow in releasing.

The operation of the C relay 214 closes contacts 245 which in turn completes a circuit for the operation of the D relay 231 from battery to the winding of the D relay 231, the operated contacts 245 of the C relay 214 to ground through the operated contacts 221 of the B relay 212.

The D relay 231 in operating closes contacts 273 which contact together with the operation of contacts 274 of the B relay 212 short circuit the right-hand winding of the D relay 231, thus making this relay slow in releasing. The operation of D relay 231 also closes contacts 276 which in turn complete a holding circuit from battery through the left-hand winding of the D relay 231, its operated contacts 276, the break contacts 272 of the B1 relay 216, the operated contacts 222 of the S1 relay 215 to ground through the operated contacts 221 of the B relay 212.

The operation of the C relay 14 also operates contacts 149 which contacts interrupt the circuit for the S relay 165 and connect the resistor 151 across the tip and ring conductors in the auxiliary trunk circuit 141 thus providing a low impedance dialing circuit. The operation of the C1 relay 237 also closes contacts 150 which contacts are in parallel with the operated contacts 149 which contacts further maintain the resistor 151 connected across the tip and ring conductors during the remainder of each of the digits dialed or pulsed from the four-wire switching system 110.

The release of the A relay 162 together with the release of the S relay 165 connects a high resistance right-hand winding of the CS relay 143 between the tip and ring conductors in the auxiliary line circuit 141. The circuit for this winding extends from the tip conductor through the break contacts 167 of the CS1 relay 247, the right-hand winding of the CS relay, the break contacts 157 of the CS1 relay 247, break contacts 156 of the S relay 165, the operated contacts 155 of the B relay 212 and the break contacts 152 of the A relay 162 to the ring conductor of the trunk 128 through the break contacts 153 of the SW relay 213.

The resistance of the right-hand winding of the CS relay 143 is sufficiently high that it does not interfere with the transmission of the open or break dial pulse from the contacts 152 of the A relay 162 to the register circuit 312. However, current flowing through this winding is in a direction to operate the CS relay 143. Thus, this relay is operated when the A relay 162 is released and this relay is relased when the A relay 162 is operated.

At the end of the first dial pulse the A relay 162 is reoperated and contacts 152 in turn operated with the result that the T and R are now closed through the resistor 151, contacts 149 of the C relay 214 in parallel with contacts 150 of the C1 relay 237, the contacts 152 of the A relay 162, contacts 153 of the SW relay 213 and then to the T and R conductors 128 extending through the switching equipment to the originating register 312 or pulse receiving circuit, thus terminating the first pulse repeated to this switching system.

The reoperation of the A relay 162 closes contacts 210 which maintain the B relay 212 operated. The reoperation of the A relay 162 again opens the break contacts 211 and interrupts the circuit of the C relay 214. This relay is slow released at this time due to closure of the contacts 240 of the B relay 212 and contacts 239 of the C1 relay 237. These relays are slow in releasing and remain operated during each series of dial pulses representing the respective digit of the called subscriber's number. As described above the reoperation of the contacts 152 interrupt the circuit through the right-hand winding of the CS winding 143 thus causing this relay to remain released at this time.

The succeeding dial pulses representing the first digit are repeated by the A relay 162 in the manner described above. The B relay 212, the C relay 214 and the C1 relay 237 remain operated during the entire series of pulses. Likewise the D relay 231 remains locked operated in the circuit described above. Likewise the S relay 165 remains released because its windings are opened at the contacts 149 of the C relay 214. The S1 relay 215, however, remains operated due to the above-described circiut through its operated contacts 222.

At the end of the first train of dial pulses representing the first symbol, digit, or denominational order of the called subscriber's number or station identification the A relay 162 will remain operated for a longer interval of time so that the C relay 214 and the C1 relay 237 release. The release of these relays removes the resistor 151 from across the tip and ring conductors of the auxiliary circuit 141 and substitutes the above-described path through the windings of the S relay 165 and the left-hand winding of the CS relay 143. The S relay 165 operates in this circuit but the current flowing through the left-hand winding of the CS relay 143 is in a direction to maintain this relay nonoperated.

The release of the C1 relay 237 at this time completes a circuit for reoperation of the ST relay 217. The operating circuit for this relay at this time extends from battery through the winding of the ST relay 217, diode 248, the operated contacts 252 of the S1 relay 215, the operated contacts 251 of the D relay 231, the released contacts 250 of the C1 relay 237 and the break contacts 249 of the B1 relay 216 to ground. The operation of the ST relay 217 closes contacts 220 and 219. The closure of these contacts together with a circuit from the timer 234 through resistor 230 to ground through the operated contacts 252 of the S1 relay 215, the operated contacts 251 of the D relay 231, the break contacts 250 of the C1 relay 237 and the break contacts 249 of the B1 relay 216, condition the timer 234 to start a timing interval of approximately one second.

Inasmuch as the pulses are being transmitted from a sender or other similar circuit at the four-wire switching system 110 and not from a subscriber, the next series of pulses representing the next symbol, digit, or denominational order of the called subscriber's designation will be transmitted to the auxiliary line circuit 141 before the expiration of the one second time interval timed by the timer 234 at this time. Consequently, the A relay 162 will respond to these succeeding dial pulses and cause the operation of the C relay 214 and the C1 relay 237 in the manner described above. As a result the contacts 250 of the C1 relay 237 open and interrupt the circuit of the ST relay 217 and also the circuit through the resistor 230. The release of the ST relay 217 opens the contacts 219 and 220 with the result that the timer 234 is restored to its original condition. Likewise the circuit through the winding of the S relay 165 is interrupted and the circuit through the right-hand winding of the CS relay 143 again closed during the time the A relay 162 is released. The circuits respond to the succeeding pulses of this digit or designation in the manner described above. At the end of this digit the timer 234 is again set into operation but interrupted by the pulses of the succeeding digit in the same manner as described above.

At the completion of the transmission of all of the dial pulses representing the called subscriber's station or designation, the A relay 162 will remain operated for a period of time longer than one second. If the called subscriber answers during this one second interval and, if in addition, reverse battery supervision in response to the subscriber's answering is repeated from or through the switching shown in FIGS. 1 and 3 to the auxiliary line circuit 141, then the CS relay 143 will operate in response to this reverse current from battery and ground applied to the T and R conductors 128 and flowing through its left-hand winding in response to the subscriber's answering the call.

As a result contacts 253 close and complete a circuit for the operation of the CS1 relay 247 from ground through the operated contacts 253 of the CS relay 143, the break contacts 254 of the SW relay 213, the operated contacts 255 of the A relay 162, the break contacts 256 of the C1 relay 237, break contacts 257 of the CS1 relay 247 and either the break contacts 258 of the T relay 218 or the break contacts 259 of the S2 relay 232 to battery through the winding of the CS1 relay 247.

The operation of the CS1 relay 247 completes a circuit for holding itself operated from battery through the winding of the CS1 relay 247, the break contacts 258 of the T relay 218 or the break contacts 259 of the S2 relay 232, and the operated contacts 257 of the CS1 relay 247 to ground through the operated contacts 221 of the B relay 212.

The operation of the CS1 relay 247 also causes contacts 260 to close and complete a circuit for the operation of the B1 relay 216. The operating circuit for the B1 relay 216 at this time extends from battery through the winding of the B1 relay 216, the operated contacts 223 of the D relay 231, the break contacts 261 of the C relay 214, the operated contacts 260 of the CS1 relay 247, the operated contacts 235 of the ST relay 217 to ground through the operated contacts 221 of the B relay 212.

If the called subscriber does not answer within the one second time interval of the timer 234 or if the answer supervision is not repeated from or through the switching system of FIGS. 1 and 3, usually when the call is an official call or when the call extends through a tandem switching center at which automatic message accounting equipment is located, then at the end of the one second time interval the timer 234 will cause the T relay 218 to be operated and this relay in turn closes contacts 224 with the result that still a different circuit is completed for the operation of the B1 relay 216. The circuit for the B1 relay 216 at this time extends from battery through the winding of the B1 relay 216, the operated contacts 223 of the D relay 231, the operated contacts 224 of the T relay 218, the operated contacts 235 of the ST relay 217 to ground through the operated contacts 221 of the B relay 212.

The operation of the B1 relay 216 in response either to the operation of the CS relay 143 or the operation of the T relay 218 in the manner described above causes contacts 158 to again be operated and remove ground from the M lead extending from the signaling circuit 111 and causes battery through the potentiometer comprising resistors 159 and 161 to be applied to this lead. As a result, the four-wire switching system 110 is conditioned for transmission and when required an answer signal may be recorded in this system.

When the B1 relay 216 operates at the end of the one second time interval timed by the timer 234, whether before or after or without answer supervision being transmitted to or through the switching equipment 120, contacts 249 open and thus interrupt the operating circuit of the ST relay 217 and the circuit through resistor 230 thus restoring the timing circuit 234 to its initial condition.

The operation of the B1 relay 216 completes a circuit for maintaining itself operated independently of contacts 235 of the ST relay 217. This circuit extends from battery through the winding of the B1 relay 216 and then through the operated contacts 223 of the D relay 231, the break contacts 261 of the C relay 214 and the operated contacts 262 of the B1 relay 216 to ground through the operated contacts 221 of the B relay 212.

The circuits then remain in the above-described condition until a disconnect signal is received either from the four-wire switching system 110 or from the switching system 120.

Assume first that a disconnect signal is first received from the four-wire switching system 110. As a result the A relay 162 releases and opens contacts 152 thus repeating the disconnect signal to the switching equipment 120. In addition, the C relay 214 and the C1 relay 237 operate in the manner described above. The operation of the C relay 214 interrupts the operating circuit of the S relay 165 and the circuit through the left-hand winding of the CS relay 143. As a result the S relay 164 releases as does the CS relay 143 if it had been previously operated in response to an answer signal being transmitted to it from the switching system of FIGS. 1 and 3.

The release of the A relay 162 as described above causes the break contacts 152 to close and connect the right-hand high resistance winding of the CS relay across the tip and ring conductors extending to the switching system shown in FIGS. 1 and 3. This circuit has been described above and extends from the R conductor through the break contacts 152 of the A relay 162, contacts 155 of the B relay 212, before this relay releases, the break contacts 156 of the S relay 165 and then through the contacts 157 and 167 of the CS1 relay 247 and right-hand winding of the CS relay 143 to the T conductor. If reverse battery supervision has not been relayed to the auxiliary circuit 141 then the CS1 relay 247 will be released so that the CS relay 143 operates as described above. If reverse battery supervision has been received by the trunk circuit 141 then the CS1 relay 247 will have been operated so that contacts 157 and 167 will be operated and reverse the winding terminals of the CS relay so that this relay will operate in the above-described circuit unless the switching system shown in FIGS. 1 and 3 has responded and opened the T and R conductors 128 within the switching system.

The release of the A relay 162 also causes contacts 210 to open and interrupt the operating circuit of the B relay 212. This relay is a slow release relay as described above and does not immediately release. However, when a disconnect signal is received the A relay 162 will remain released sufficiently long to allow this B relay 212 to also release. The release of the B relay 212 opens contacts 221 and thus interrupts the holding or operating circuits of the B1 relay 216 and the S1 relay 215 and the D relay 231.

If the CS relay 143 is released by the time the B relay 212 releases indicating that the T and R conductors 128 have been released in the switching system of FIGS. 1 and 3, the release of the B relay 212 releases the B1 relay 216, the S1 relay 215 and the D relay 231 and restores the circuits to their idle or normal condition.

If, however, the CS relay 143 is not released at the time the B relay 212 releases thus indicating that the switching system of FIGS. 1 and 3 and then the other switching equipment connected thereto has not released the previously established connection, then upon the release of the B relay 212, a circuit is completed for the operation of the SW relay 213 from battery through the winding of this relay, the break contacts 263 of the B relay 212, the break contacts 264 of the B1 relay 216, the break contacts 265 of the A relay 162 and the operated contacts 253 of the CS relay 143 to ground. The SW relay 213 then operating closes its contacts 254 and thus completes a holding circuit from battery through its winding and contacts 254 to ground through the contacts 253 of the CS relay 143.

The operation of the SW relay 213 also closes contacts 153 which complete a holding circuit for the CS relay 143 from the R conductor 128 through the operated contacts 153 of the SW relay 213 and the break contacts 156 of the S relay 165 and then through the contacts 157 and 167 of the CS1 relay 247 and the right-hand winding of the CS relay 143 to the T conductor. The operation of the SW relay also opens the R and T conductors at contacts 153 and 166. Later when the circuit through the switching system of FIGS. 1 and 3 has been released the CS relay 143 will release and in turn release the SW relay 213 and restore the circuit to its idle or initial condition.

If a circuit is again seized by the four-wire switching system 110 prior to the release of the CS relay 143, the A relay 162 operates and in turn operates the B relay 212 and the B1 relay 216. This relay in turn operates the ST relay 217 and initiates the operation of the timer 234 in the manner described above. However, the SW relay 213 maintains the T and R conductors open to the switching system of FIGS. 1 and 3 thus preventing the reseizure of this equipment before the previously established path has been released. Then upon the release of this path the CS relay 143 releases as described above and releases the SW relay 213 whereupon the closure of the contacts 153, 166 and 152 complete a circuit for the initiation for another call through the switching system of FIGS. 1 and 3 and thereafter the circuits operate in the manner described above.

If a call is released or abandoned during dialing, the release of the A relay 162 causes the various relays to operate in essentially the same manner as described above which causes the previously established connections or paths to be released and the circuits restored to their initial condition.

If the release or abandonment occurs during the timing of the one second interval by the timer 234, the operation of the C1 relay 237 causes contacts 250 to open and thus restore the timer 234 to its initial or idle condition. The circuits then operate in substantially the same manner as described above to release the previously-established connection.

Assume now that the called subscriber disconnects first and further that answering supervision has been returned to the auxiliary line circuit 141. Thus when the called party disconnects the CS relay 143 will release. Inasmuch as reverse battery supervision has been returned to the auxiliary line circuit 141, the CS1 relay 247 will be operated at this time. Consequently, the release of the CS relay 143 at this time completes a circuit for the operation of the S2 relay 232 from battery through the winding of relay 232, the operated contacts 266 of the B1 relay 212, the operated contacts 267 of the S1 relay 215, the operated contacts 268 of the CS1 relay 247, to ground through the break contacts 270 of the CS relay 143. This operation of the S2 relay 232 causes contacts 269 to close and complete a locking or holding circuit from battery through the winding of S2 relay 232, the operated contacts 266 of the B1 relay 216, the operated contacts 269 of the S2 relay 232 to ground through the operated contacts 221 of the B relay 212.

With the contacts 272 of the B1 relay 216 operated and contacts 271 of the CS1 relay 247 operated at this time, the release of the CS relay 143 opens contacts 253 and thus interrupts a holding circuit for the D relay 231. This relay is slow to release at this time due to the short circuit around its right-hand winding due to the closure of contacts 273 of the D relay 231, contacts 274 of the B relay 212 and contacts 275 of the B1 relay 216. The release of the D relay 231 causes contacts 226 to close and complete an above-described circuit for the operation of the ST relay 217 through the diode 227. In addition with the S2 relay 232 operated contacts 233 are opened so that both timing resistors 228 and 229 are connected in series to the timer 234 and as a result this timer is set for a time interval of approximately three hundred milliseconds in accordance with an exemplary embodiment of this invention.

The release time of the D relay 231 and the three hundred mililsecond time interval of timer 234 is provided at this time to prevent momentary false operations of the called subscriber's subset from disconnecting the connection.

The operation of the T relay 218 in response to timer 234 at the end of approximately 300 milliseconds, in the exemplary embodiment of our invention described herein, causes the break contacts 224 to open and interrupt the holding circuit for the B1 relay 216. This relay releases and opens contacts 225 which in turn release the ST relay 217 and the ST relay 217 in turn opens contacts 219 and 220 thus restoring the timer 234 to its initial state.

The release of the B1 relay 216 causes contacts 266 to open and release the S2 relay 232. In addition the release of the B1 relay 216 causes contacts 158 to open and reconnect ground to the M conductor extending to the signaling circuit 111. This signal is then relayed to the four-wire switching system as a disconnect signal. Thereafter the four-wire switching system sends a disconnect signal to the auxiliary circuit 141 and causes the A relay 162 to release. The release of this relay first causes the C relay 214 to operate and then the C1 relay 237 to operate. Thereafter the B relay 212 releases and causes the C relay 214 and the C1 relay 237 to release in turn and restore the circuit to its idle condition.

Assume that reverse battery answer supervision had not been returned to the auxiliary line circuit 141. Consequently, the CS relay 143 is not operated during the call. Then if it is further assumed that a disconnect signal is relayed or transmitted from the switching system of FIGS. 1 and 3 to the auxiliary line circuit 141 the S relay 165 releases. At this time neither the CS relay 143 nor the CS relay 247 are operated.

The release of the S relay 165 causes the break contacts 241 to close and complete a circuit from battery through the winding of the S2 relay 232, the operated contacts 266 of the B1 relay 216, the operated contacts 267 of the S1 relay 215, the break contacts 268 of the CS1 relay 247, the break contacts 241 of the S relay 165 to ground through the operated contacts 221 of the B relay 212.

The release of the S relay 165 also causes the make contacts 241 to open and interrupt the holding circuit of the D relay 231 thus allowing this relay to release. The release of this relay causes contacts 226 to close and activate the timer circuit 234 in the manner described above. The operation of the T relay 218 at the end of the timing interval determined by the timer 234 causes the break contacts 224 to open and interrupt the holding circuit of the B1 relay 216 thus causing this relay to release. The release of the B1 relay 216 again connects ground to the M lead as a disconnect signal to the four-wire switching system. When this system disconnects it causes the A relay 162 to release and the circuit responds thereafter as described above.

It is to be understood that the above-described arrangements are illustrative of the application of the principles of the invention. Numerous other arrangements may be devised by those skilled in the art without departing from the spirit and scope of the invention.

What is claimed is:

1. In a crossbar telephone switching system, a switching network of crossbar switches arranged in a line link frame switching group and a trunk link frame group, an incoming trunk circuit, an auxiliary circuit for interconnecting said incoming trunk circuit with switches of said line link frame switching group including means responsive to incoming calling signals, and means for repeating said calling signals to said crossbar telephone switching system, wherein said crossbar system includes originating registers for registering incoming calling signals, means for interconnecting said registers with incoming circuits, and means jointly responsive to the interconnection of one of said registers with said incoming trunk and to the termination of a predetermined time interval to transmit a ready signal back over said incoming trunk circuit.

2. In a crossbar telephone switching system, the combination in accordance with claim 1 wherein said auxiliary circuit includes means for generating and transmitting back over said incoming trunk circuit an answering signal.

3. In a communications switching system, a plurality of subscriber line terminals and means for establishing communication paths from said subscriber line terminals through said switching system, signal receiving means connected to said system, means for conditioning said system for selectively transmitting signals from said subscriber line terminals through said system to said signal receiver means, an incoming trunk circuit, and interconnecting means for interconnecting said incoming trunk with certain of said subscriber line terminals, wherein said interconnecting means includes apparatus jointly responsive to said conditioning of said system and to the termination of a predetermined time interval for transmitting a ready signal back over said incoming trunk circuit, and means for generating and transmitting an answer signal back over said incoming trunk circuit.

4. In a communications switching system, a plurality of subscriber line terminals and means for establishing communication paths from said subscriber line terminals through said switching system, signal receiving means connected to said system, means for conditioning said system for selectively transmitting signals from said subscriber line terminals through said system to said signal receiver means, an incoming trunk circuit, and interconnecting means for interconnecting said incoming trunk with certain of said subscriber line terminals, wherein said interconnecting means includes apparatus jointly responsive to said conditioning of said system and to the termination of a predetermined time interval for transmitting a ready signal back over said incoming trunk circuit, and means for testing previously established paths through said system for preventing the transmission of said ready signal.

No references cited.

WILLIAM C. COOPER, *Primary Examiner.*